United States Patent
Carl (10) Patent No.: US 11,932,309 B2
(45) Date of Patent: Mar. 19, 2024

(54) FRONT-END STRUCTURE ARRANGEMENT FOR A MOTOR VEHICLE BODYSHELL AND ASSEMBLY CARRIER FOR SUCH A FRONT-END STRUCTURE ARRANGEMENT

(71) Applicant: Daimler AG, Stuttgart (DE)

(72) Inventor: Michael Carl, Gerlingen (DE)

(73) Assignee: Daimler AG, Stuttgart (DE)

( * ) Notice: Subject to any disclaimer, the term of this patent is extended or adjusted under 35 U.S.C. 154(b) by 327 days.

(21) Appl. No.: 17/292,069

(22) PCT Filed: Nov. 6, 2019

(86) PCT No.: PCT/EP2019/080442
§ 371 (c)(1),
(2) Date: May 7, 2021

(87) PCT Pub. No.: WO2020/094742
PCT Pub. Date: May 14, 2020

(65) Prior Publication Data
US 2021/0394833 A1     Dec. 23, 2021

(30) Foreign Application Priority Data
Nov. 9, 2018   (DE) ................... 10 2018 008 832.5

(51) Int. Cl.
  *B62D 25/08*   (2006.01)
  *B62D 21/11*   (2006.01)
  *B62D 21/15*   (2006.01)

(52) U.S. Cl.
  CPC .............. *B62D 25/08* (2013.01); *B62D 21/11* (2013.01); *B62D 21/155* (2013.01); *B62D 21/152* (2013.01)

(58) Field of Classification Search
  CPC ...... B62D 25/08; B62D 21/11; B62D 21/155; B62D 21/152

(Continued)

(56) References Cited

U.S. PATENT DOCUMENTS

| 5,074,374 A | 12/1991 | Ohtake et al. |
| 5,271,473 A * | 12/1993 | Ikeda ................... B60K 11/04 296/203.02 |

(Continued)

FOREIGN PATENT DOCUMENTS

| DE | 40 25 031 A1 | 2/1991 |
| DE | 602 11 298 T2 | 9/2006 |

(Continued)

OTHER PUBLICATIONS

PCT/EP2019/080442, International Search Report dated Feb. 14, 2020 (Two (2) pages).

(Continued)

*Primary Examiner* — Amy R Weisberg
*Assistant Examiner* — Dana D Ivey
(74) *Attorney, Agent, or Firm* — Crowell & Moring LLP (57) ABSTRACT

A front-end structure arrangement of a bodyshell of a motor vehicle includes a front-end structure which has a first longitudinal member and a second longitudinal member where the first longitudinal member and the second longitudinal member are connected to one another. An assembly carrier is fastened to the bodyshell, extends in a free space between the first longitudinal member and the second longitudinal member, and has a first side region that runs laterally along the first longitudinal member to form a first gap and has a second side region that runs laterally along the second longitudinal member to form a second gap. A first supporting element of a protective device is disposed in the first gap and runs laterally along the first longitudinal member to form a third gap between the first supporting element and the first longitudinal member. The third gap is smaller than the first gap.

10 Claims, 6 Drawing Sheets

(58) Field of Classification Search
USPC .................................................. 296/187.09
See application file for complete search history.

(56) References Cited

U.S. PATENT DOCUMENTS

| | | | |
|---|---|---|---|
| 6,899,195 B2 | 5/2005 | Miyasaka | |
| 8,657,365 B2* | 2/2014 | Amano | B62D 21/152 |
| | | | 296/187.11 |
| 2018/0022387 A1 | 1/2018 | Ta et al. | |

FOREIGN PATENT DOCUMENTS

| | | |
|---|---|---|
| DE | 10 2011 004 105 A1 | 8/2012 |
| DE | 10 2013 012 875 A1 | 4/2014 |
| DE | 10 2017 002 972 A1 | 10/2017 |
| WO | WO 2012/163487 A1 | 12/2012 |
| WO | WO 2016/149836 A1 | 9/2016 |

OTHER PUBLICATIONS

German-language German Office Action issued in German application No. 10 2018 008 832.5 dated Oct. 17, 2019 (Five (5) pages).
Chinese Office Action issued in Chinese application No. 201980073764.4 dated Sep. 2, 2022, with partial English translation (Twelve (12) pages).

* cited by examiner

FRONT-END STRUCTURE ARRANGEMENT FOR A MOTOR VEHICLE BODYSHELL AND ASSEMBLY CARRIER FOR SUCH A FRONT-END STRUCTURE ARRANGEMENT

BACKGROUND AND SUMMARY OF THE INVENTION

The invention relates to a front-end structure arrangement for a motor vehicle bodyshell. The invention further relates to an assembly carrier for such a front-end structure arrangement.

Such a front-end structure arrangement is already known, for example, from DE 10 2017 002 972 A1, in which a front-end structure of the motor vehicle bodyshell comprises two longitudinal members running parallel to and spaced apart from each other in the longitudinal direction of the vehicle, which are connected to each other at their front-ends at least indirectly via a cross-member, in the present case a bumper cross-member. Furthermore, the front-end structure arrangement comprises an assembly carrier fastened to the vehicle bodyshell for receiving and holding an electric drive. The assembly carrier extends here in a free space between the longitudinal members and has side regions that run laterally along the longitudinal members, forming a gap.

Due to the increasing variety of drive assemblies of motor vehicles, many different installation possibilities arise in the region of a uniform front-end structure, whereby the behavior of different front-end structure arrangements in the event of an accident can vary considerably. In particular, frontal collisions with a small width-wise overlap of the other involved party or the front-end structure arrangement and a crash barrier, or a diagonal impact with the other involved party or a crash barrier, in particular with little or even no overlap between the front-end structure and that of the other involved party/obstacle, until now, could only be controlled in terms of accident behavior by means of substantial other measures.

It is therefore the object of the present invention to create a front-end structure arrangement as well as an assembly carrier of the type mentioned at the outset, by means of which the accident behavior of the front-end structure arrangement can be significantly improved in a simple manner.

In order to create a front-end structure arrangement of the type mentioned at the outset which has improved accident behavior, it is provided in accordance with the invention that in the gap between at least one of the side regions of the assembly carrier and the laterally associated longitudinal member, i.e., the longitudinal member arranged adjacently to this side region, a supporting element of a protective device is provided, which supporting element extends laterally along the associated longitudinal member, forming a further, smaller gap, and the associated longitudinal member. Accordingly, a supporting element is arranged in at least one of the two gaps between each side region of the assembly carrier and the laterally associated longitudinal member, and a further, smaller gap is thereby created between the supporting element and the associated longitudinal member. Therefore, the supporting element turns the corresponding gap into a smaller gap, which then runs between the supporting element and the associated longitudinal member.

The supporting element according to the invention has the effect here that, in the event of a frontal collision with little or no width-wise overlap with an obstacle or in the event of a diagonal impact with an obstacle, a block is formed as early as possible between the relevant longitudinal member, the laterally associated supporting element and the assembly carrier, and, as applicable, the drive assembly itself, in order to hereby transfer energy to the side of the vehicle facing away from the impact and displace the vehicle in the transverse direction of the vehicle away from the point of impact with the obstacle, whereby intrusions into the passenger compartment located behind the front-end structure can be significantly reduced overall.

The further, smaller gap provided in accordance with the invention between the supporting element and the laterally associated longitudinal member has the advantage here that the structural elements of the front-end vehicle structure relevant to the crash, and in particular of the longitudinal member facing the supporting element in combination with the cross-member supported thereon, possibly with energy absorption elements arranged therebetween, are not impaired in the event of a frontal collision with full or at least partial overlap of the vehicle structure with an obstacle or another party involved in the accident. This is achieved, for example, by the fact that, in the event of an accident-related deformation of the longitudinal member with absorption of impact energy, no disturbance is caused by the supporting element arranged laterally next to it. This means that the at least one supporting element preferably does not influence, or only influences to a negligible extent, the desired, defined deformation of the longitudinal members or of the energy absorption elements arranged between them and a flexible bumper cross-member, also referred to as crash boxes.

In a further embodiment of the invention, the supporting element is designed as an assembly part and is fastened on sides of the assembly carrier. This enables extremely simple manufacture and combination of the assembly carrier, and extremely simple assembly of the combination formed of the assembly carrier and the protective device.

A further advantageous embodiment of the invention provides that a supporting element of the protective device is provided in the gap between both side regions of the assembly carrier and the associated longitudinal member, and in each case runs laterally along the associated longitudinal member, forming a further, smaller gap. The advantages already described above on both sides of the vehicle result from the arrangement and design of the supporting element on both sides relative to the laterally associated longitudinal member.

A further advantageous embodiment of the invention provides that the two supporting elements of the protective device are designed as identical parts. This further simplifies the manufacture and assembly of the protective device.

In a further embodiment of the invention, the assembly carrier extends to near the front-end region of the longitudinal members. This results in a particularly favorable block formation in the direction of the assembly carrier in the event of a collision with a small width-wise overlap with an obstacle or a collision partner or in the event of a diagonal impact of a collision partner or an obstacle, whereby a transfer of force of the impact energy to the side of the vehicle facing away from the impact and thus a greater displacement of the front-end structure in the transverse direction of the vehicle away from the other party involved in the collision/the obstacle can be achieved. This in turn reduces the risk of intrusion into the passenger compartment and an associated risk of injury to the vehicle occupants.

A further advantageous embodiment of the invention provides that the supporting element projects upwards and/or downwards in the vertical direction of the vehicle beyond the associated longitudinal member, i.e., the longitudinal member arranged directly adjacently to it. In this way, a reliable transmission of force between a longitudinal member and the associated supporting element can be ensured in a particularly favorable manner in the event of an accident-related application of force.

A further advantageous embodiment of the invention provides that the assembly carrier has a cross-member which is supported with at least one end against the laterally associated supporting element, in particular in its upper region. This also allows a particularly favorable transmission of an accident-related force to the laterally arranged longitudinal member, the associated supporting element and, subsequently, the assembly carrier.

Another advantageous embodiment of the invention is provided when the supporting element is supported in a lower region on a bearing of an assembly on the assembly carrier. This enables a particularly favorable introduction of force via the supporting element into the assembly in question, which then also contributes to the block formation. This additionally increases the rigidity of the assembly carrier. The supporting element in question can be additionally or exclusively secured to the subframe of the assembly carrier.

The advantages described above in conjunction with the front-end structure arrangement according to the invention apply in the same way to the assembly carrier.

Further advantages and details of the invention will become apparent from the following description of a preferred embodiment example and on the basis of the drawings. The features and combinations of features mentioned above in the description and also the features and combinations of features mentioned hereinafter in the description of the figures and/or shown alone in the figures are usable not only in the described combination, but also in other combinations or in isolation, without departing from the scope of the invention.

DETAILED DESCRIPTION OF THE DRAWINGS

In the figures, identical or functionally identical elements are provided with like reference signs.

Figure 1:
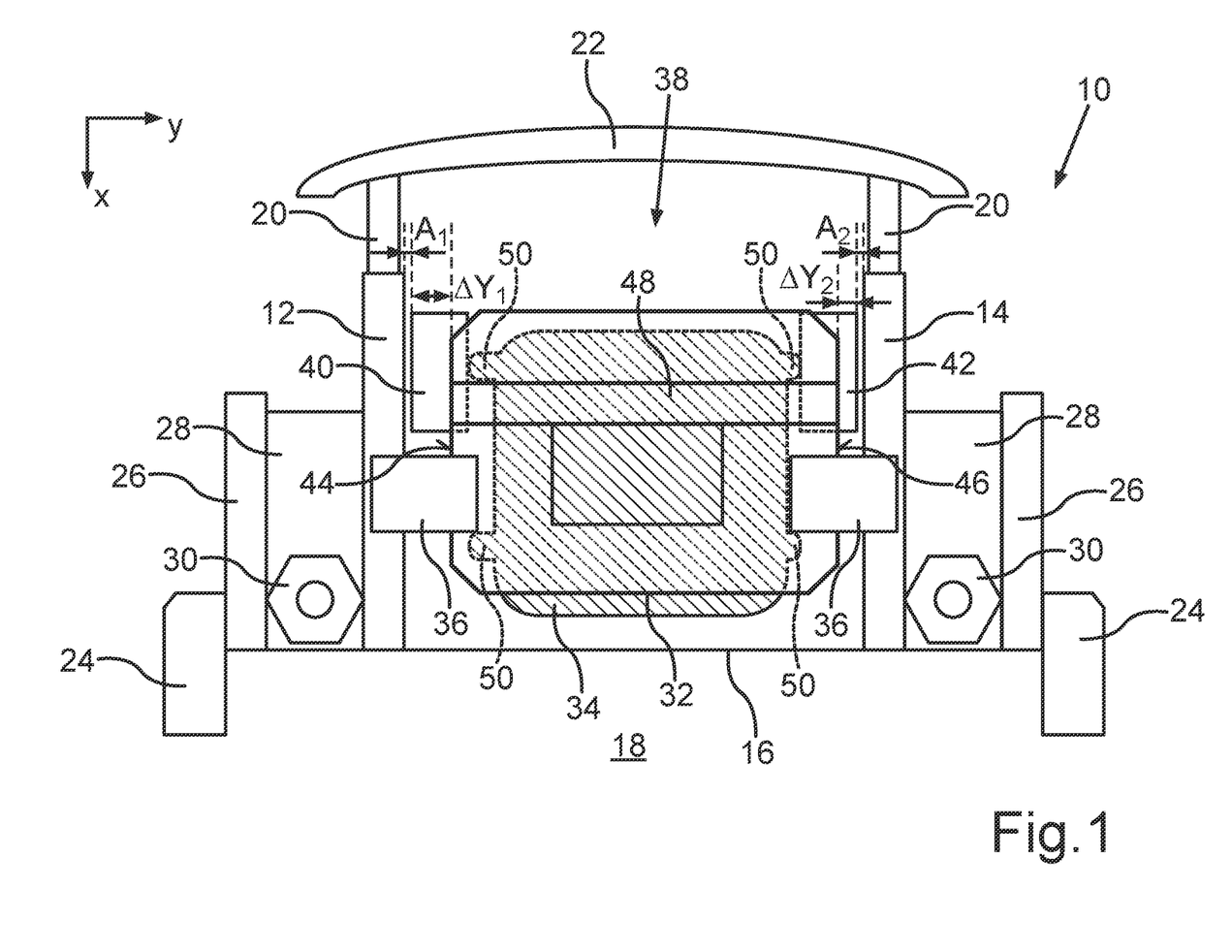
FIG. 1 shows a plan view of a front-end structure arrangement according to the invention for a motor vehicle bodyshell with longitudinal members which are connected to one another at their front ends via a cross-member, in particular a flexible bumper cross-member, and with an assembly carrier which is fastened to the motor vehicle bodyshell, extends in a free space between the longitudinal members and has side regions which run laterally along the longitudinal members, forming a gap, a supporting element being arranged in each gap, forming a further, smaller gap towards the laterally associated longitudinal member.
Figure 2:
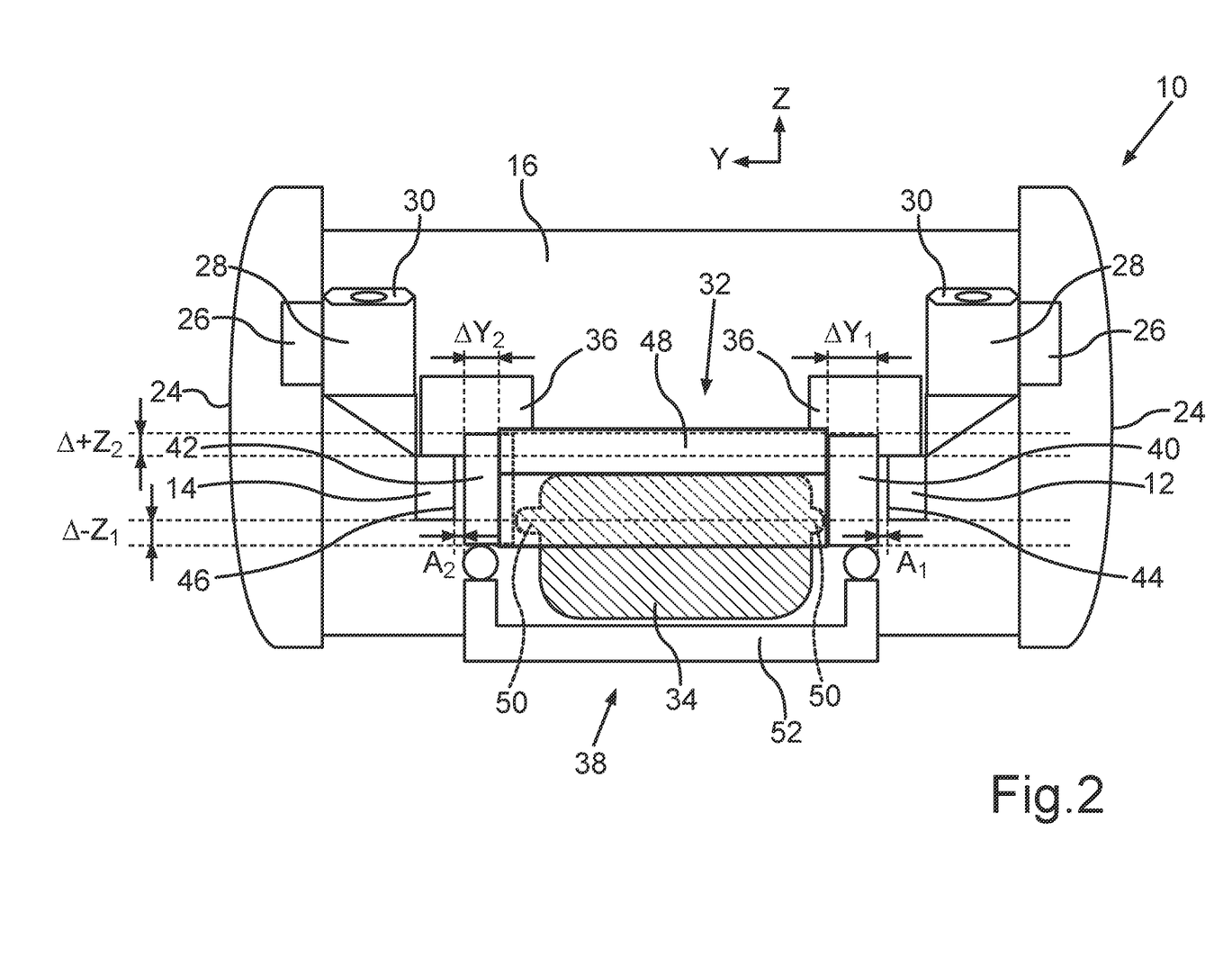
FIG. 2 shows a front view of the front-end structure arrangement according to FIG. 1, in which in particular the positioning of a drive assembly on the assembly carrier with associated sub-frame can be seen.
Figure 3:
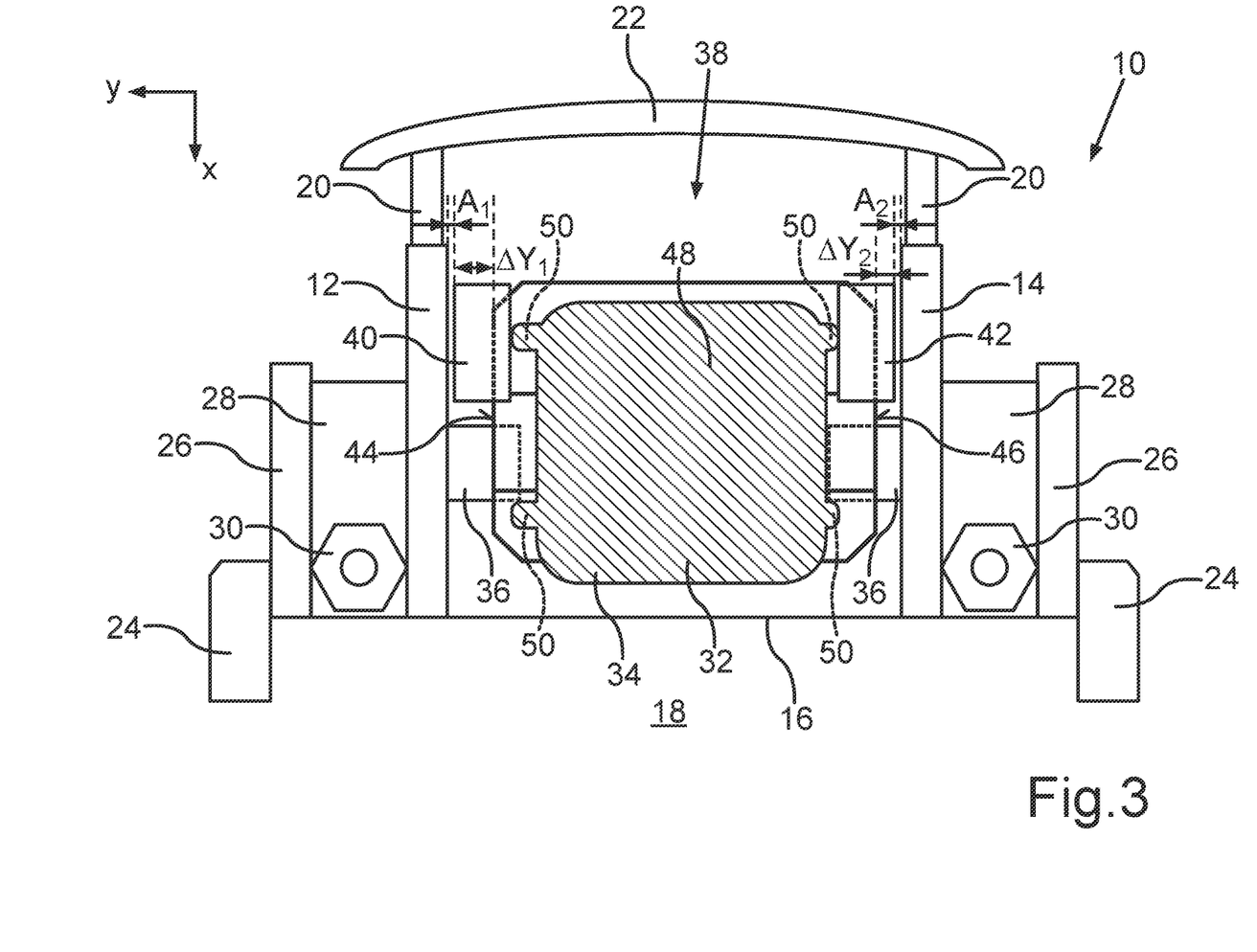
FIG. 3 shows a view from below of the front-end structure arrangement according to FIGS. 1 and 2.

In FIGS. 1 to 3, a front-end structure arrangement for a passenger car is shown in a plan view, a front view and a view from below. Fundamentally, longitudinal members 12, 14 of a front-end structure 10 are visible and extend parallel to one another from a front end wall of a passenger compartment 18 towards the front in the longitudinal direction of the vehicle (x-direction). The two longitudinal members 12, 14 are indirectly connected to one another at their front ends—namely by means of energy absorption elements 20, often also referred to as crash boxes—via a cross-member 22, in the present case a bumper cross-member, which can be assigned to a front module together with the energy absorption elements 20. Further side walls 24 of the motor vehicle bodyshell are shown in the region of corresponding door pillars (A-pillars), and are connected to the end wall 16. Lastly, upper longitudinal members 26 are also supported on the end wall 16, and likewise extend in the longitudinal direction of the vehicle (x-direction) and are connected to the main longitudinal members 12, 14 via bodyshell components 28, with damper domes 30 or suspension strut mounts for the corresponding front wheels (not visible) being integrated into the bodyshell components 28.

In addition to the front-end structure 10, the front-end structure arrangement comprises, in particular, an assembly carrier 32, which in the present case is designed to accommodate a drive assembly 34 for an electrically operable drive train of the motor vehicle. In the present case, the assembly carrier 32 is fastened to or supported on the laterally corresponding longitudinal members 12, 14 via bearing elements 36.

Looking at FIGS. 1 and 2 together, it can be seen in particular that the assembly carrier 32 is located in a free space between the longitudinal members 12, 14. In other words, the assembly carrier 32 extends at least over a height region between the two longitudinal members 12, 14 based on the vehicle's vertical direction (z-direction). In addition, the assembly carrier 32 extends close to the front end regions of the longitudinal members 12, 14.

The side regions 44, 46 of the assembly carrier 32 form a gap S with the corresponding longitudinal members 12, 14, which—as in the present case—may have different widths or identical widths on both sides of the assembly carrier 32.

In these gaps S between the side regions 44, 46 and the corresponding longitudinal members 12, 14, there is presently arranged in each case a supporting element 40, 42 of a protective device 38, and the supporting elements are supported on the inside on the relevant side region 44, 46 of the assembly carrier 32 and form on the outside a further gap $A_1$ or $A_2$ with the associated longitudinal member 12, 14, which is smaller than the associated gap S. In other words, the supporting elements 40, 42 reduce the gap S between the assembly carrier 32 and the relevant longitudinal member 12, 14 to the gap $A_1$ or $A_2$, respectively, between the corresponding supporting element 40, 42 and the corresponding longitudinal member 12, 14. The two smaller gaps $A_1$ and $A_2$ are formed here over the entire length—analogously to the gap S—i.e., the supporting element 40, 42 extends parallel to the corresponding main longitudinal member 12, 14.

Each of the two supporting elements 40, 42 is designed in the present case as a single-part or multi-part assembly part which can be fastened to the assembly carrier 32 as part of a pre-assembly process and is then installed together with the drive assembly 34 in the front-end structure 10 as part of, for example, a final assembly process of the assembly carrier 32. The design of the supporting elements 40, 42 as assembly parts and their preferably preliminary fastening to the assembly carrier 32 thus enables extremely simple manufacture and assembly of the assembly carrier 32 with the protective device 38. It should be mentioned at this juncture that a supporting element 40 can also be provided only on one side of the assembly carrier 32, but not on the other side. In addition, the two supporting elements 40, 42—in the case of an individual adaptation to structural conditions or varying rigidity of the front-end structure 10, or for other reasons—can be differently dimensioned. However, it is particularly advantageous if the two supporting elements 40, 42 are designed as identical parts and can therefore be manufactured extremely easily. The supporting elements 40, 42 can in particular be manufactured from a metal alloy by die casting or extrusion. If necessary, they can, for example, be designed in the manner of energy absorption elements (crash boxes), for example made of an appropriate sheet-metal material, or can be designed as plastic components on the whole.

As can be seen from FIG. 2, the supporting element 40, which can be seen on the right in the present case, is substantially rectangular in shape and has a width $\Delta Y1$. The opposite supporting element 42 is substantially L-shaped in cross-section and has a leg width $\Delta Y2$ which is smaller than the width $\Delta Y1$ of the other supporting element 40.

Both supporting elements 40, 42 are supported in the present case on a cross-member 48, which—as can be seen in particular from FIG. 1—runs in a front region of the assembly carrier 32 in the transverse direction of the vehicle and on the upper side thereof or at the front of the drive assembly 34. In a lower region, the supporting elements 40, 42 are supported on a corresponding bearing 50, via which the drive assembly 34 is supported and fastened to the assembly carrier 32. Furthermore, it can be seen from FIG. 2 that each supporting element 40, 42 projects upwards beyond the laterally associated longitudinal member 12, 14 by a dimension $\Delta+Z_1$ and downwards by a dimension $\Delta-Z_2$.

The support of the supporting elements 40, 42 on the upper side on the cross-member 48 of the assembly carrier 32 and on the lower side via the bearings 50 on the drive assembly 34 results in an extremely favorable block formation, so that accident forces can be transferred particularly favorably between both vehicle sides in a manner described in greater detail below.

Figure 4A:
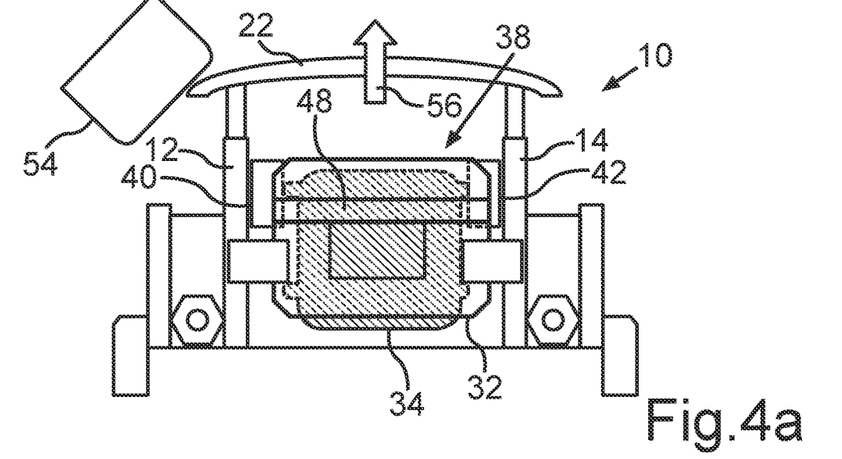
FIG. 4a to FIG. 4c show plan views of the front-end structure arrangement analogous to FIG. 1, showing the deformation of the front-end structure arrangement in the event of a diagonal impact of an obstacle, for example a vehicle without overlap between the vehicle structural parts, before the start of the collision, in an early phase of the impact, and in a late phase of the impact.
Figure 4B:
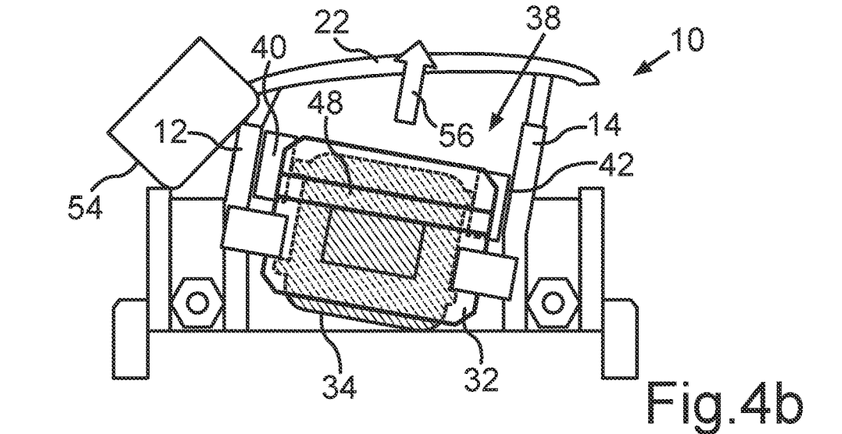
Figure 4C:
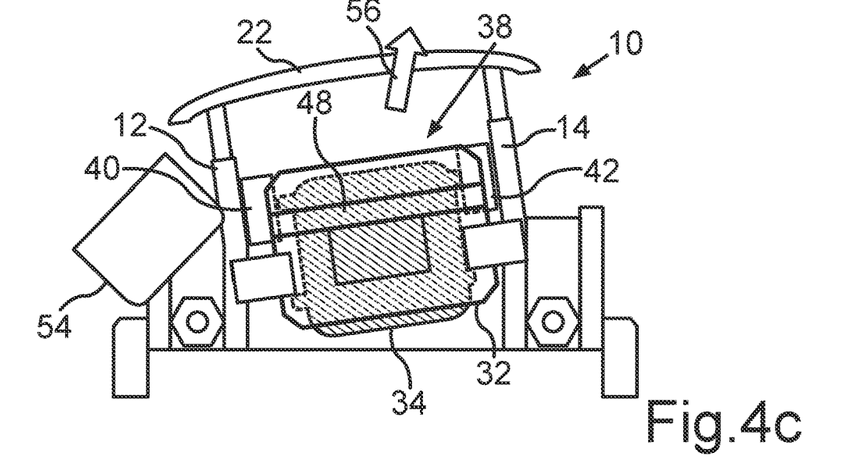

The projection of the longitudinal members 12, 14 by the supporting elements 40, 42 results in particular in a particularly favorable force transfer of an accident-related force from one side of the vehicle to the other, even if, for example, a component of the accident force is oriented in the vertical direction of the vehicle (z-direction) and, as a result, there should be, for example, a shift in the height of the supporting elements 40, 42 with the assembly carrier 32 and the drive assembly 34. Lastly, it can be seen from FIG. 2 that a sub-frame 52 in the form of an axle structure, which can be designed as an integral member or suspension sub-frame, is arranged on the underside of the drive assembly 34. This sub-frame 52 increases the rigidity or block formation of the entire assembly carrier 32 with the drive assembly 34. FIGS. 4b and 4c show plan views of the front-end structure arrangement analogous to FIG. 1 during the course of a diagonal impact without overlap of the vehicle structure with another party involved in the collision or an obstacle 54. The vehicle moves here according to the direction arrow 56 in the direction of forward travel at a corresponding speed. According to FIG. 4b, the front-end structure arrangement then hits the obstacle 54 in the region of the left side of the vehicle, causing a displacement of the front-end structure 10 or of the vehicle in the transverse direction of the vehicle (y-direction) by the amount $Y_1$. As can be seen together with the further course of the accident scenario in a late phase of the impact according to FIG. 4c, the earliest possible block formation of the longitudinal members 12, 14 with the supporting elements 40, 42 of the protective device 38 as well as of the assembly carrier 32, in which in addition the drive assembly 34 as well as the associated bearings 50 and cross-member 48 ensure a stiffening/block formation, leads to a transfer of energy to the side of the vehicle facing away from the impact and a displacement of the vehicle in the transverse direction of the vehicle (y-direction) by the amount $Y_j$, as a result of which the front-end structure arrangement as a whole is displaced further away from the obstacle 54 in the transverse direction of the vehicle (y-direction) and hereby the intrusions into the passenger compartment 18 can be reduced. In addition, the direction of the vehicle changes, as can be seen from the arrow 56.

The scenario described here in conjunction with an oblique impact also applies, for example, to a frontal collision with little or no width overlap of the vehicle structure with an obstacle or another party involved in the accident.

Figure 5A:
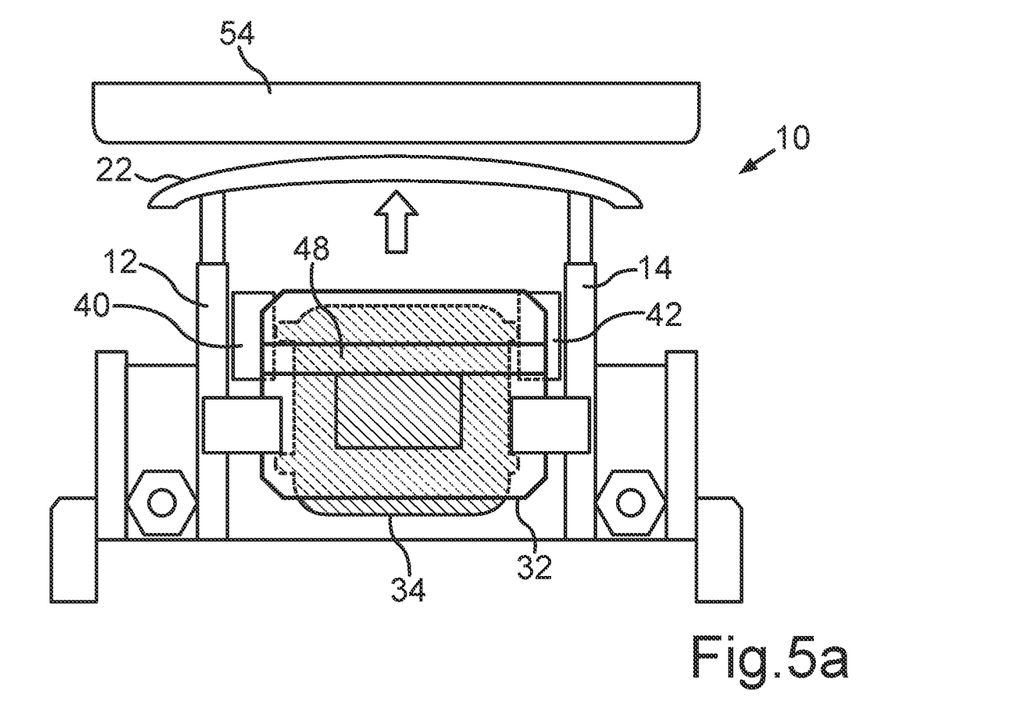
FIGS. 5a and 5b show plan views of the front-end structure arrangement analogous to FIG. 1, wherein the front-end structure arrangement is shown before and during the course of a deformation as a result of an accident-related application of force in the event of a collision with full overlap of the vehicle structure with another party involved in the collision or an obstacle.

FIG. 5a shows, analogously to FIG. 1, a plan view of the front-end structure arrangement before the intrusion with full overlap of the vehicle structure with another party involved in the accident or an obstacle.

Figure 5B:
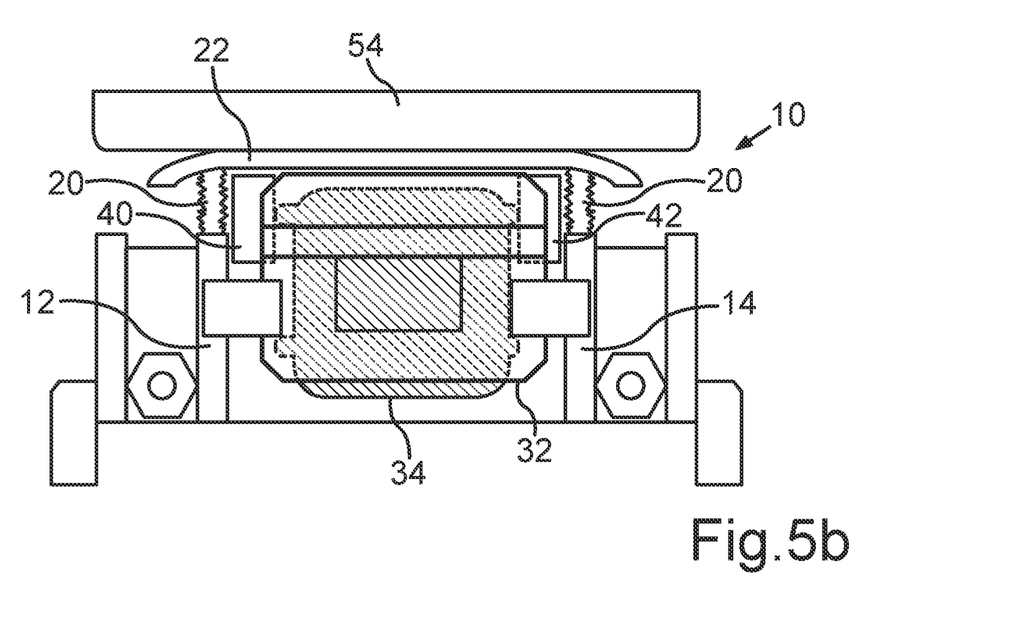

As can be seen from FIG. 5b, which shows the front-end structure arrangement in a late phase of the impact, the present arrangement of the supporting elements 40, 42 or the provision of a gap $A_1$ or $A_2$ between the supporting elements 40, 42 and their associated longitudinal member 12, 14 means that an unhindered deformation of the front-end structure—in particular of the longitudinal members 12, 14 and the corresponding energy absorption elements 20—is still possible without the deformation being impeded by the protective device 38 with the supporting elements 40, 42.

Figure 6A:
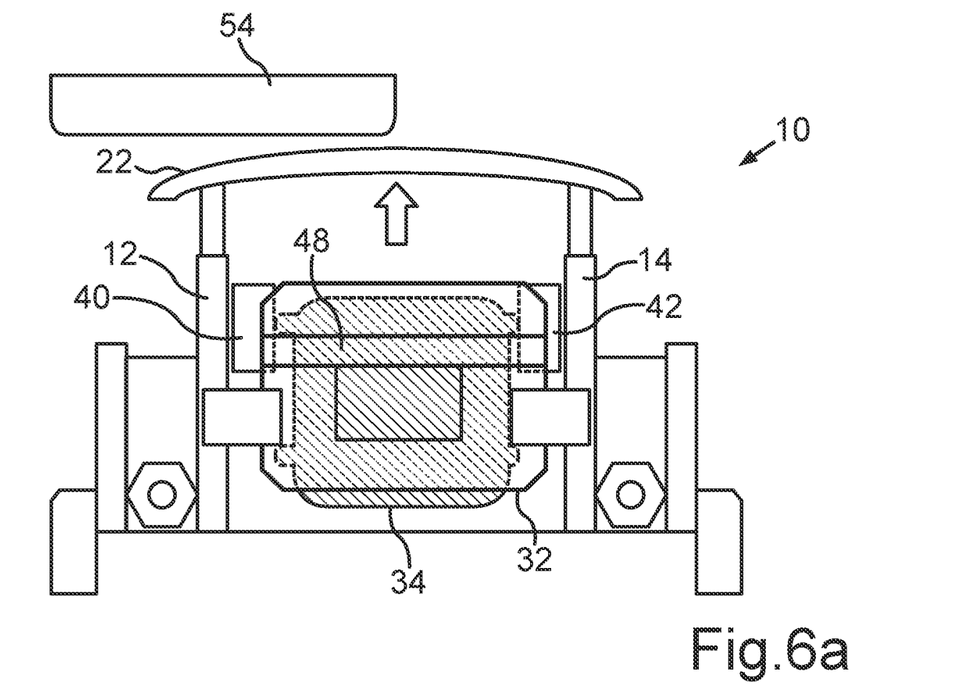
FIGS. 6a and 6b show plan views of the front-end structure arrangement analogous to FIG. 1, in which this is shown before and during an accident-related deformation as a result of a frontal collision with partial overlapping of the vehicle structure with another party involved in the collision or an obstacle.

Lastly, FIG. 6a shows a plan view of the front-end structure arrangement analogous to FIG. 1 shortly before a frontal collision with partial overlap of the vehicle structure with another party involved in the accident or the obstacle 54.

Figure 6B:
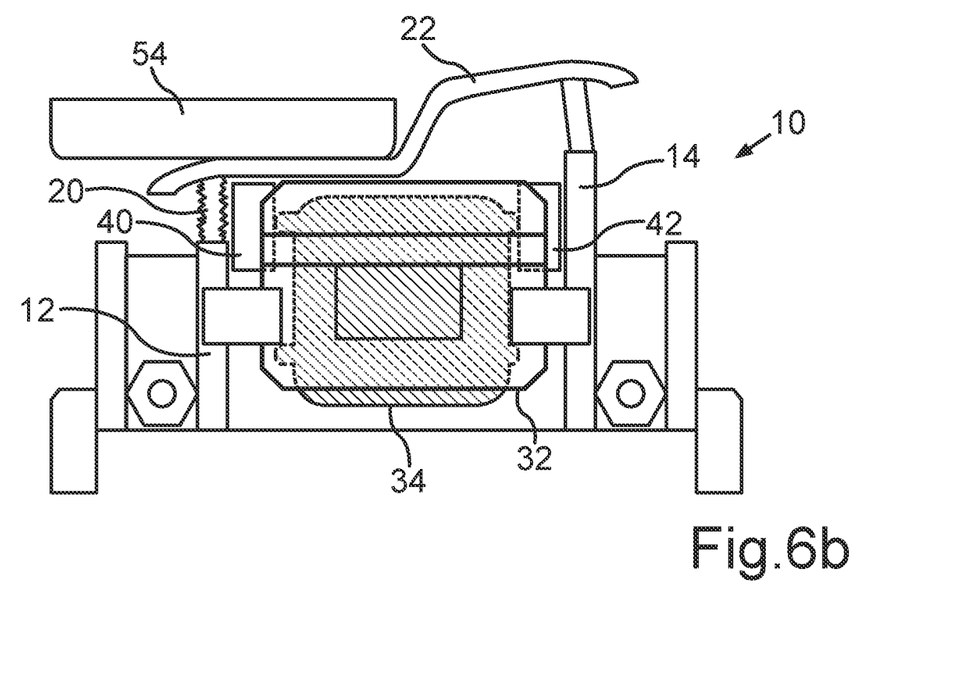

As can be seen from FIG. 6b, which shows the front-end structure arrangement in a late phase of the frontal collision, the energy absorption, in particular of the longitudinal member 12 with the associated energy absorption element 20, is also not hindered here by the laterally associated supporting element 40.

Overall, it can thus be seen that the present front-end structure arrangement enables improved accident behavior, in particular in the case of the described diagonal impact or an impact of an obstacle 54 with a small width-wise overlap, in that an improved block formation is created between the longitudinal members 12, 14, the protective device 38 with the supporting elements 40, 42 and the assembly carrier 32—as applicable with integration of the drive assembly 34—whereas the functions of the front-end structure 10 can be maintained unchanged in the event of a frontal collision with full overlap or partial overlap of the vehicle structure with another involved party or an obstacle 54.

What is claimed is:

1. A front-end structure arrangement of a bodyshell of a motor vehicle, comprising:
    a front-end structure which has a first longitudinal member and a second longitudinal member running in a longitudinal direction of the motor vehicle, wherein the first longitudinal member and the second longitudinal member are connected to one another at a respective front end at least indirectly via a first cross-member;
    an assembly carrier, wherein the assembly carrier is fastened to the bodyshell, extends in a free space between the first longitudinal member and the second longitudinal member, and has a first side region that runs laterally along the first longitudinal member to form a first gap between the assembly carrier and the first longitudinal member and has a second side region that runs laterally along the second longitudinal member to form a second gap between the assembly carrier and the second longitudinal member; and
    a protective device with a first supporting element, wherein the first supporting element is disposed in the first gap and extends with a longest dimension parallel to the first longitudinal member such that the first gap between the assembly carrier and the first longitudinal member is reduced.

2. The front-end structure arrangement according to claim 1, wherein the first supporting element is formed as a mounting part and is fastened on the assembly carrier.

3. The front-end structure arrangement according to claim 1 further comprising a second supporting element, wherein the second supporting element is disposed in the second gap and extends with a longest dimension parallel to the second longitudinal member such that the second gap between the assembly carrier and the second longitudinal member is reduced.

4. The front-end structure arrangement according to claim 3, wherein the first supporting element and the second supporting element are formed as identical parts.

5. The front-end structure arrangement according to claim 1, wherein the assembly carrier extends near to a respective front end region of the first longitudinal member and the second longitudinal member.

6. The front-end structure arrangement according to claim 1, wherein the first supporting element projects upwards and/or downwards in a vertical direction of the vehicle beyond the first longitudinal member and wherein the second supporting element projects upwards and/or downwards in the vertical direction of the vehicle beyond the second longitudinal member.

7. The front-end structure arrangement according to claim 1, wherein the first supporting element and the second supporting element are supported on a second cross-member of the assembly carrier in a front region of the assembly carrier.

8. The front-end structure arrangement according to claim 1, wherein the first supporting element and the second supporting element are supported in a lower region of the assembly carrier on a bearing of an assembly on the assembly carrier.

9. The front-end structure arrangement according to claim 1, wherein a sub-frame is disposed on an underside of the assembly carrier and wherein the first supporting element and the second supporting element are fastened to the sub-frame.

10. An apparatus, comprising:
    an assembly carrier for a front-end structure arrangement of a motor vehicle bodyshell, wherein the assembly carrier is configured for arrangement in a free space between a first longitudinal member and a second longitudinal member of a front-end structure, wherein the first longitudinal member and the second longitudinal member run in a longitudinal direction of the motor vehicle, and wherein the first longitudinal member and the second longitudinal member are connected to one another at a respective front end at least indirectly via a cross-member;
    fastening elements for securing the assembly carrier to the motor vehicle bodyshell;
    a first side region and a second side region of the assembly carrier, wherein, in an installed state of the assembly carrier in the front-end structure arrangement of the motor vehicle bodyshell, the first side region runs laterally along the first longitudinal member to form a first gap between the assembly carrier and the first longitudinal member and the second side region runs laterally along the second longitudinal member to form a second gap between the assembly carrier and the second longitudinal member; and
    a protective device with a supporting element, wherein the supporting element, in the installed state of the assembly carrier, is disposed in the first gap and extends with a longest dimension parallel to the first longitudinal member such that the first gap between the assembly carrier and the first longitudinal member is reduced.

* * * * *